Jan. 3, 1967 HANS-PETER ANTES 3,296,384

ELECTRONIC STEPPING SWITCH

Filed Nov. 27, 1964 3 Sheets-Sheet 1

INVENTOR:
Hans-Peter Antes

BY Mestern, Ross & Mestern

INVENTOR:
Hans-Peter Antes
BY

INVENTOR:
Hans-Peter Antes
BY
Mestern, Ross & Mestern

United States Patent Office 3,296,384

Patented Jan. 3, 1967

3,296,384

ELECTRONIC STEPPING SWITCH

Hans-Peter Antes, Siesmayerstrasse 58, Frankfurt am Main, Germany

Filed Nov. 27, 1964, Ser. No. 414,478
Claims priority, application Germany, Nov. 27, 1963, R 36,662; Oct. 31, 1964, R 39,152
11 Claims. (Cl. 179—100.1)

My present invention relates to an electronic stepping switch adapted to be used for sequentially connecting several alternating-current sources to a load, e.g. for the purpose of periodically sampling the output of a plurality of recording devices connected in parallel to a common signal generator to produce multiple copies of a message.

In the duplication of audio-frequency messages from a master recorder on a multiplicity of secondary recording media with the aid of a corresponding number of transcribing recorders, for example, it is desirable to monitor the outputs of all the transcribing recorders in cyclic succession in order to ascertain whether each of them is operating properly. If any such recorder is found to perform unsatisfactorily, it should be disconnected from the system so as not needlessly to produce an unusable copy.

If manual switches or conventional relays are used for sequentially connecting the reading heads of the monitored recording devices to a suitable indicator, such as a pair of earphones or other electroacoustic transducer, then the switch operation will give rise to objectionable clicks which will distract the operator and which may even be picked up by the recorders. Thus, it has been found that a listening-in interval of about three seconds per sample is adequate for purposes of evaluation if there is no interfering background noise at the instant of switchover; the presence of such noises, on the other hand, necessitates longer periods for the adjustment of the ear to the sound level of the message and also impedes direct comparison between successive samples.

It is, therefore, the general object of my present invention to provide a switching system adapted to carry out the aforedescribed switchover operations without objectionable noise.

Another object of this invention is to provide means for selectively lengthening the sampling period, as where a particular recorder happens to be cut in during a pause in the transcribed message, or for skipping a recorder which has been or is about to be deactivated because of unsatisfactory performance.

A further object of my invention, allied with the preceding one, is to provide automatic means for deactivating and bypassing a recorder in response to improper operation thereof as determined by a testing circuit.

A stepping switch according to the present invention, adapted to be used in a system conforming to the aforestated objects, comprises a plurality of monostable multivibrator units each including a normally conductive first amplifier stage and a normally blocked second amplifier stage, e.g. a pair of vacuum triodes. The normally conductive first stage is triggerable into a temporary state of nonconductance during which, in a manner well known per se in the multivibrator art, the companion stage is unblocked; an associated time-constant network determines the duration of this off-normal state upon whose termination a trigger pulse is transmitted to the next-succeeding stage to initiate a similar off-normal condition in the latter. In contradistinction to conventional monostable multivibrators (sometimes termed "monovibrators") in which the temporarily conductive stage is maintained above the saturation point of its characteristic so as to be substantially nonresponsive to modulating signals applied to its input, the multivibrator units of my present system are so designed that the normally blocked second stage thereof becomes only limitedly conductive in the off-normal state of the respective unit so as to reproduce, generally in amplified form, the signals from a respective recording device or other audio-frequency current source connected to its input. With the units so interconnected that only one of them can be off-normal at any time under steady-state operating conditions, a load circuit connected in parallel to the output electrodes of all the second-stage amplifiers will thus successively receive the audio-frequency signals from all the devices respectively working into these stages. With suitable adjustment of the time-constant networks associated with these units, therefore, a sampling interval of desired duration (e.g. on the order of seconds) may thus be established for each device to be monitored.

Switches may be provided, according to a further feature of my invention, for the selective application of a blocking potential to the normally conductive first stage of a unit whereby the latter is maintained off-normal independently of its timing circuit, the same switches advantageously serving to disconnect the signal-reproducing second stages of all other units from their power supply in order to prevent any untimely switchover.

According to a further feature of my invention, each multivibrator unit is provided with a bypass circuit which, when selectively completed by a special switch, transmits the trigger pulses from a preceding unit to a following unit while maintaining the bypassed unit in its normal, non-amplifying condition. This special switch may be thrown by the operator upon ascertainment of a defect in the output of the recording device working into that particular unit; according to a further feature of my invention, however, the switch is actuated automatically in response to a defect signal from a test circuit which compares the monitored signals with signals from a reference recorder bearing the same message. Thus, in accordance with this feature, a master recorder or other signal source transmits its message simultaneously to the reference recorder and to all the monitored recording devices whose outputs are sequentially sampled as described above; the signals continuously read out from the reference recorder and the samples successively delivered by the load circuit of the electronic stepping switch are then compared in the test circuit which may have the form of a bridge network with amplifiers for the reference signals and the samples in respective arms. A suitable relay, of electromagnetic or other type, in a diagonal of the bridge responds to an imbalance and trips the bypass switch of the momentarily operative multivibrator unit to deactivate same until the defective recorder can be repaired or replaced.

The above and other features of my invention will become more fully apparent from the following detailed description, reference being made to the accompanying drawing in which.

Figure 1:
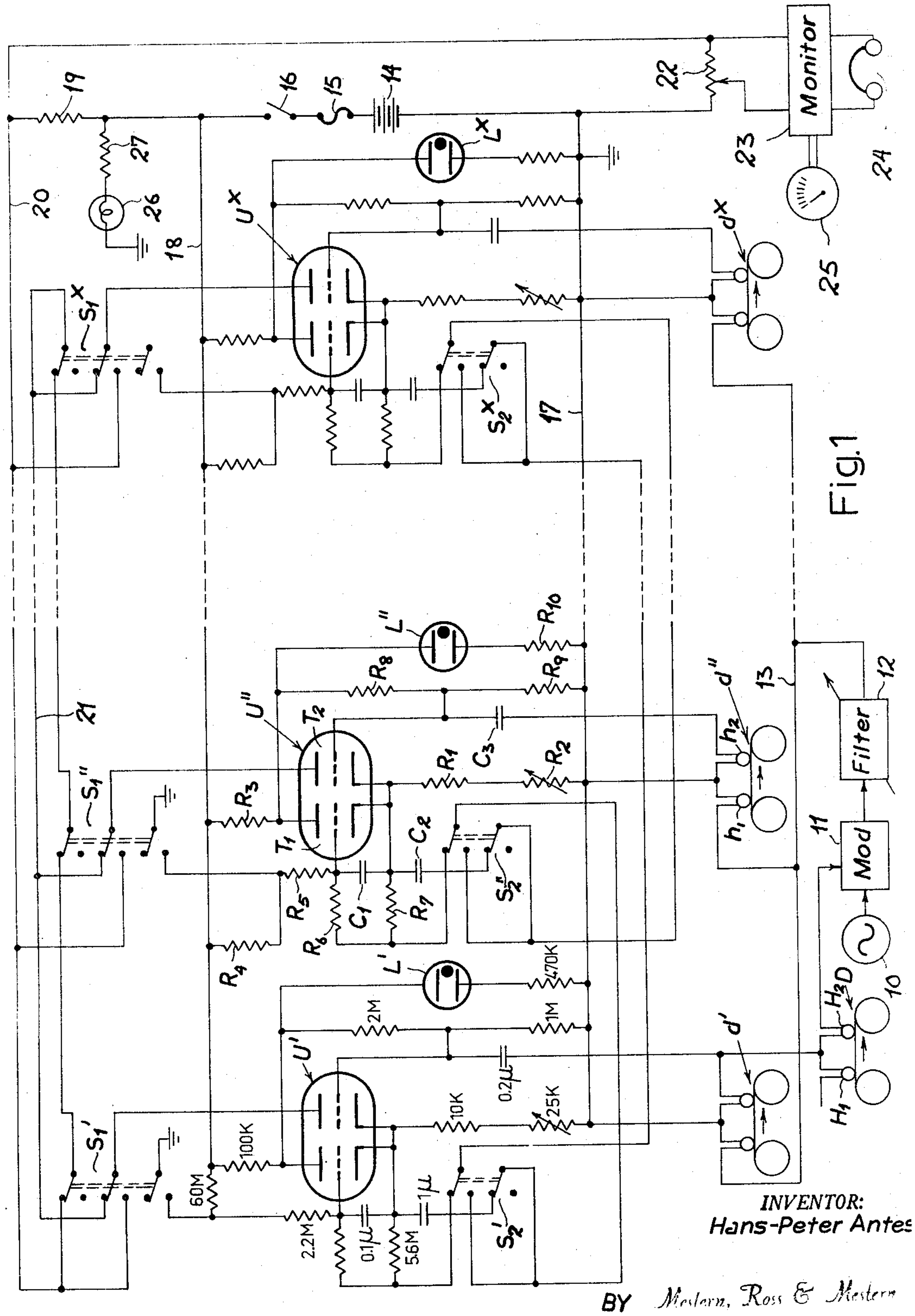
FIG. 1 is a circuit diagram of a system comprising a plurality of recording devices working into an electronic stepping switch according to the invention.
Figure 2:
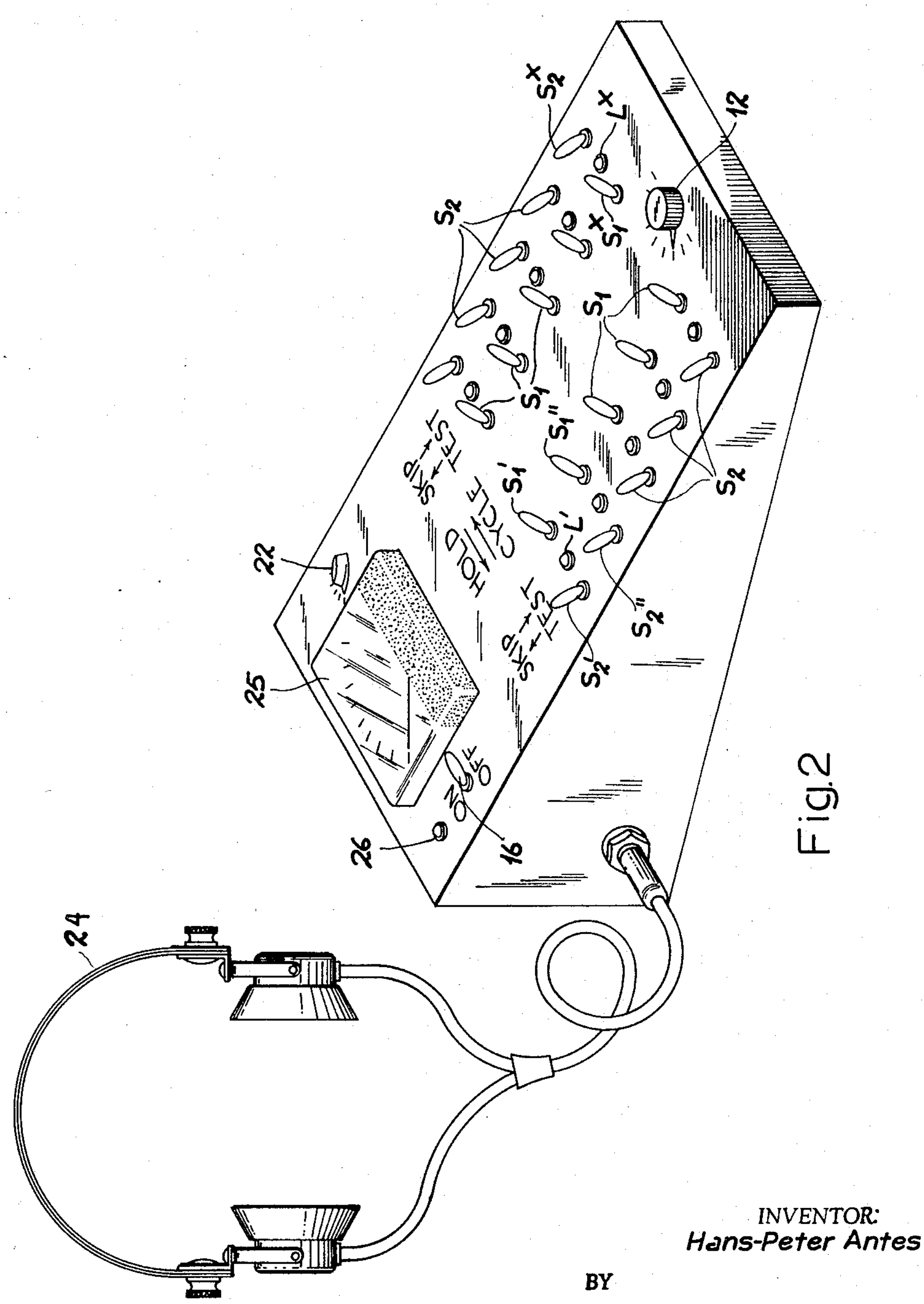
FIG. 2 is a perspective view of an apparatus incorporating the system of FIG. 1.

Reference will first be made to FIGS. 1 and 2. The apparatus illustrated in FIG. 2 serves to monitor a plurality of recording devices (ten in the specific embodiment illustrated) of which only the first, the second and the last, respectively designated *d'*, *d''* and $d^x$, have been shown in FIG. 1. Each of these devices is represented, by way of illustration, as comprising a progressively moving elongated recording medium, such as a magnetic tape, for the storage of information supplied in the form of autio-frequency signals to a conventional recording head $h_1$; a conventional reading head $h_2$, positioned downstream of the recording head $h_1$, picks up the stored signals for delivery to a receiver therefor. The heads $h_1$ of devices $d'$, $d''$ . . . $d^x$ are all concurrently energized from the output of a reading head $H_2$ of a master recorder D whose own tape is being or has previously been inscribed with signals applied to a recording head $H_1$. The audio-frequency signals read out by head $H_2$ are fed, along with a high-frequency carrier from an oscillator 10, to a modulator 11 which may also include a conventional equalizer to insure linearity of the frequency response. The output of modulator 11 passes through an adjustable filter 12 enabling selective attenuation of certain frequency ranges for purposes of tone control; the input heads $h_1$ of all the transcribing recorders $d'$ etc. are connected in parallel to the output lead 13 of filter 12.

Associated with each recording device $d'$, $d''$ . . . $d^x$ is a respective multivibrator unit of which only three, designated U′, U″ and $U^x$, have been shown. A D.-C. power supply for these multivibrator units has been indicated diagrammatically as a battery 14 in series with a fuse 15 and a main switch 16, the negative and positive terminals of this battery being respectively connected to a grounded bus bar 17 and a live bus bar 18. A resistor 19 connects bus bar 18 with a secondary bus bar 20 which in turn is tied to a further positive bus bar 21 through a series of normally closed contacts of manually operable switches $S_1'$, $S_1''$ . . . $S_1^x$ respectively associated with the units U′, U″ . . . $U^x$. Bus bars 17 and 20 are connected across a load here shown to comprise an output potentiometer 22 working into a monitoring device 23, such as an audio amplifier, which feeds a pair of earphones 24 and supplies a rectified voltage to a volume indicator 25. A signal lamp 26, connected in series with a ballast resistor 27 between bus bar 18 and ground, indicates the operative condition of the system.

The units U′, U″ . . . $U^x$ are all identical and will be described in detail with specific reference to unit U″; the various resistors and capacitors may have the numerical values (in ohms and farads, respectively) indicated in unit U′.

Multivibrator unit U″ comprises a first and a second amplifier stage in the form of two vacuum triodes $T_1$, $T_2$, shown for convenience as housed in a common envelope. Each triode is provided with the usual cathode, plate and control grid although, of course, further electrodes (such as screen or suppressor grids) could be added if desired. The two cathodes of stages $T_1$, $T_2$ are shown tied together and connected to ground bus bar 17 via a fixed cathode resistor $R_1$ and an adjustable cathode resistor $R_2$ in series therewith. The plate of stage $T_1$ is joined to positive bus bar 18 through an anode resistor $R_3$ individual to this unit, the plate of stage $T_2$ being normally connected to the auxiliary bus bar 21 through the middle armature and break contact of its own switch $S_1''$ and thence to bus bar 20 through the upper armatures and break contacts of all unoperated switches $S_1'$–$S_1^x$ in series so as to receive its positive supply voltage by way of resistor 19 which thus serves as a common plate resistance for the left-hand or first stages of all the multivibrator units U′–$U^x$. The grid of stage $T_1$ is connected to bus bar 18 by way of two series resistors $R_4$, $R_5$ whose junction point is tied to a normally open-circuited make contact of the bottom armature of switch $S_1''$. This grid is further coupled with its cathode through the intermediary of a timing circuit comprising a condenser $C_1$ shunted by two series resistors $R_6$, $R_7$; the magnitudes of the elements $C_1$, $R_6$, $R_7$ are preferably so chosen that its time constant is on the order of seconds. The two interconnected cathodes are coupled via another condenser $C_2$ and the lower armature and break contact of a normally closed switch $S_2''$ to the upper armature and break contact of the corresponding switch of the immediately following stage, the latter break contact being tied to the junction of the resistors of the timing circuit thereof; in analogous manner, the junction of timing resistors $R_6$, $R_7$ of unit U″ is connected through the break contact and upper armature of switch $S_2''$ to the lower armature and break contact of switch $S_1''$ associated with the preceding unit U′. The upper armature of switch $S_2''$ also has a make contact directly connected to its lower armature. The plate of stage $T_1$ is connected to ground on bus bar 17 through a voltage divider composed of resistors $R_8$ and $R_9$ in series, these resistors being bridged by a indicator lamp L″, such as a glow tube, in series with a ballast resistor $R_{10}$; the junction of resistors $R_8$ and $R_9$ is connected to the grid of stage $T_2$ and, through a blocking condenser $C_3$, the reading head $h_2$ of the corresponding recording device $d''$.

FIG. 2 illustrates the physical location of tone control 12, starting switch 16, volume control 22, earphones 24, indicator 25, signal lamp 26 and switches $S_1'$, $S_1''$ . . . $S_1^x$ (generally designated $S_1$) and $S_2'$, $S_2''$ . . . $S_2^x$ (generally designated $S_2$) together with the associated indicator lamps L′, L″ . . . $L^x$ of the several multivibrator units. As shown, the inner switches $S_1'$–$S_1^x$ are horizontally movable toggle switches whereas the outer switches $S_2'$–$S_2^x$ are vertically movable switches of similar type. Normally, the switches $S_1'$ etc. are in their "CYCLE" position from which they may be displaced into a "HOLD" position; normally, again, the switches $S_2'$ etc. are in their "TEST" position from which they can be thrown into a "SKIP" position for the respective unit.

The operation of the system of FIGS. 1 and 2 is as follows:

Upon the closure of main switch 16, and of such other auxiliary starting switches as may be provided, all the multivibrator units are energized in parallel. The grid of stage $T_1$ of each unit is initially at cathode potential so that this stage will carry but little current and the voltage drop across its anode resistor $R_3$ will be low; the grid of stage $T_2$ will therefore be relatively positive, hence this stage will conduct and draw current through resistor 19 along with corresponding stages of all other units.

As the condenser $C_1$ begins to charge, stage $T_1$ becomes more highly conductive and drives the grid of stage $T_2$ more negative while raising the potential of both cathodes owing to the cathode-follower effect of resistors $R_1$ and $R_2$. This will eventually cut off all the right-hand triodes except one, the common anode resistor 19 being so dimensioned that the resulting rise in the potential of secondary bus bars 20 and 21 will cause the energization of just one tube (say, the triode $T_2$ of unit U″) to an extent sufficient to cut off the companion stage $T_1$ through the aforementioned cathode-follower effect whereby the left-hand plate acquires the potential of bus bar 18 (e.g. 300 volts) and stabilizes the potential of the grid of stage $T_2$ at a relatively positive value. Which one of the multivibrator stages is reversed in this manner depends, of course, on minute differences in the parameters of the substantially identical multivibrator circuits.

As long as stage $T_1$ remains thus cut off, the grid of the stage $T_2$ establishes an operating point on a substantially linear portion of the characteristic of triode $T_2$ so that signals supplied to this grid, or to some other control electrode of the right-hand stage of unit U″, will be developed in amplified form across the resistor 19 for delivery to the load circuit 22–25. With the recording devices $d'$–$d^x$ connected to the units U′–$U^x$ in the manner shown, reading head $h_2$ of recorder $d''$ will apply such signals to the grid of stage $T_2$ via condenser $C_3$ for a limited time interval, i.e. until condenser $C_1$ has discharged through resistors $R_6$, $R_7$ to a sufficient extent to initiate induction in triode $T_1$. Anode resistor $R_3$ is of sufficient magnitude to cut off the tube section $T_2$ upon the passage of a very small current through section $T_1$ so that, for an instant, very little current passes through the entire tube and the cathodes thereof go momentarily positive. This positive pulse is transmitted through condenser $C_2$ and the lower armature of switch $S_2''$ to the left-hand grid of the next multivibrator unit, thereby triggering the latter into its off-normal condition with limited conductivity of its right-hand section for a period determined by the associated RC network. As the rise in the grid voltage of triode $T_1$ continues, this triode becomes fully conductive and the indicator lamp L'', which is lit upon cutoff of the triode, is extinguished while the corresponding lamp of the next unit lights up substantially concurrently. Thus there occurs a smooth transition of conductivity from the right-hand stage of multivibrator unit U'' to the corresponding stage of the next unit, and so on, with repetition of the cycle after unit $U^x$ has reverted to normal and has triggered the unit U'.

Since the successive switchovers from one recording device to the next occur without audible clicks, the operator will hear a continuous message if all the recording devices $d'$–$d^x$ operate at substantially the same output level. If the delivery becomes discontinuous, noisy or otherwise faulty when a particular indicator lamp $L'$–$L^x$ is lit, the operator can immediately deactivate the corresponding multivibrator unit by throwing the associated switch $S_2$ into its "SKIP" position whereby the trigger pulses from the cathodes of the preceding unit will not reach the left-hand grid of the affected units but will be transmitted to the corresponding grid of the next unit whose bypass switch has not been thrown. Naturally, the operator may concurrently deactivate the defective recording device associated with the bypassed unit.

If, for any reasons, the operator desires to prolong the state of conductivity of triode $T_2$, he throws the corresponding switch $S_1$ (e.g. $S_1''$) whereby the left-hand grid of the unit is permanently grounded through the lower armature of that switch, the potential of this grid being thus more negative than that of the cathode on account of the voltage drop across the resistors $R_1$ and $R_2$. The operation of any switch $S_1$ also breaks the connection between bus bars 20 and 21 so that only the plate of section $T_2$, connected directly to bus bar 20 through the middle armature of the operated switch $S_1''$, will be supplied with operating potential and no transfer of conductivity to another unit can occur until the switch is restored.

Figure 3:
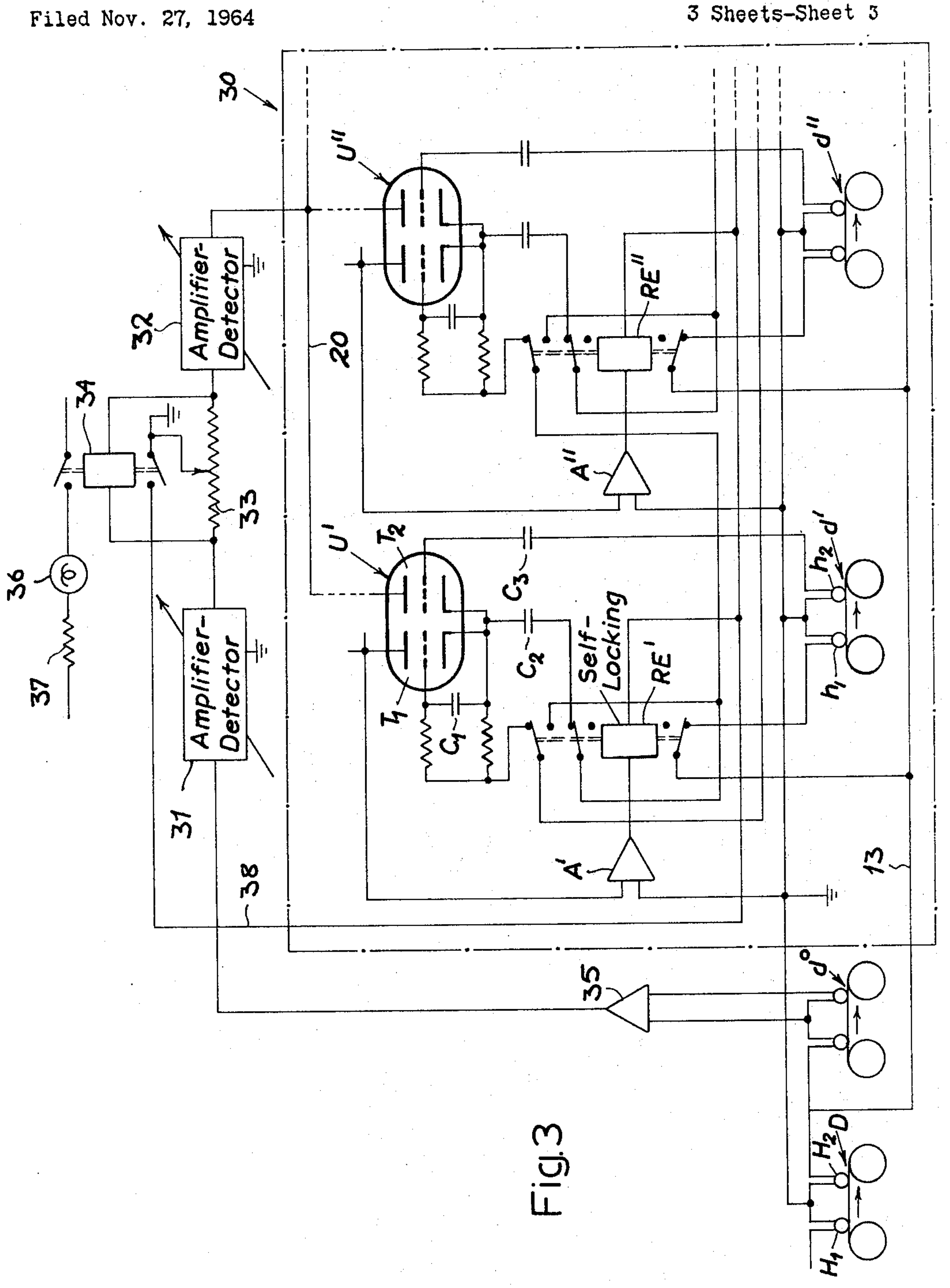
FIG. 3 is a circuit diagram of a modified system, including automatic means for bypassing and deactivating a defective recorder.

In FIG. 3 I have shown a modification of the circuit arrangement of FIG. 1 designed to operate automatically the contacts for bypassing a multivibrator unit associated with a defective recorder. The assembly 30 of FIG. 3 corresponds in substance to the system illustrated in FIG. 1, only the first two units U' and U'' thereof having been shown together with their respective recording devices $d'$, $d''$. A further recording device $d°$, energized in parallel with devices $d'$, $d''$ etc. from master recorder D, serves as a source of reference signals.

A test circuit, designed to compare the output of reference recorder $d°$ with that of the monitoring system 30, comprises a pair of amplifier-detectors 31, 32 in two arms of a bridge whose other arms are constituted by respective parts of a resistor 33 having a grounded variable tap. A sensitive instrument, here shown diagrammatically as a relay 34, is connected across a diagonal of the bridge 31–33 to respond to any imbalance in the outputs of the preferably adjustable amplifier-detectors 31 and 32. Amplifier 31 is energized from the reading head of recorder $d°$ via a preamplifier 35, amplifier 32 being connected to bus bar 20 in lieu of or in parallel with the monitoring assembly 22–25 of FIG. 1.

An alarm lamp 36, in series with a resistor 37 and the upper armature of relay 34, is energizable from battery 14 (FIG. 1) or any other convenient current source upon the energization of that relay in response to a voltage difference between the opposite terminals of resistor 33. Thus, an operator observing the lighting of lamp 36 may simply reverse the bypass switch S'' of the unit indicated by the one lamp $L'$–$L^x$ which is lit concurrently with lamp 36. In the system illustrated in FIG. 3, however, I have shown means for automatically accomplishing this result, the switches $S_2'$, $S_2''$ etc. having been replaced by relays RE', RE'' etc. energizable in the off-normal condition of the respective multivibrator unit via the grounded lower armature of relay 34 in the event of an imbalance. For this purpose a lead 38 extends from the lower front contact of relay 34 to the windings of all the relays RE', RE'' etc. in parallel, a source of operating current for each of the latter relays being provided in the form of a respective amplifier A', A'' etc. connected between ground and the corresponding left-hand plate of the unit, thus in parallel with or in place of the associated indicator lamp L', L'' etc. of FIG. 1. Amplifiers A', A'' etc. are so biased as to become conductive, to an extent sufficient to operate the respective switching relay RE', RE'' etc., only if the corresponding left-hand tube section ($T_1$) is nonconducting. The switching relays RE', RE'' etc. are self-locking, either with the aid of mechanical latching means or through a conventional holding circuit not illustrated, so as to remain in their operated condition. Each of these relays has a top and a middle armature, corresponding to the two aforedescribed armatures of switches $S_2$, as well as a bottom armature which in the locked state of the relay disconnects the input conductor 13 from the head $h_1$ of the associated recording device. The same relay may, of course, also deactivate the drive motor (not shown) of such recording device or otherwise arrest the magnetic tape thereof.

Modifications of the specific circuitry and structure described and illustrated are, of course, possible within the spirit and scope of my invention as defined in the appended claims.

I claim:

1. The combination of a plurality of alternating-current sources and a load with an electronic stepping switch for periodically connecting in sequence said alternating-current sources with said load, said stepping switch comprising a power supply; a bank of cyclically interconnected monostable multivibrator units each respectively interposed between one of said sources and said load and each including a normally conductive first amplifier stage and a normally blocked second amplifier stage connected across said power supply, said first stage being triggerable into a temporary state of nonconductance with concurrent unblocking of said second stage whereby the latter is operative as a reproducer of signals from a respective alternating-current source individually connected thereto; a time-constant network connected to the first stage of each unit for determining the duration of said temporary state; circuit means operative upon the termination of said temporary state in response to reversal of conductivity of the stages of any unit for transmitting a trigger pulse to the immediately succeeding unit, thereby initiating said temporary state in said succeeding unit; and a load circuit jointly connected to the outputs of the second stages of all said units.

2. The combination defined in claim 1, said switch further comprising selectively operable contact means for extending said temporary state of any one unit by the application of a blocking potential to said first stage thereof.

3. The combination defined in claim 1, said switch further comprising selectively operable first contact means for extending said temporary state of any one unit by the application of a blocking potential to said first stage thereof, and second contact means ganged with said first contact means for concurrently disconnecting the second stages of all other units from said power supply.

4. The combination as defined in claim 1, said switch further comprising contact means operable to deactivate a selected unit by completing a bypass connection therearound whereby a trigger pulse from a unit preceding the selected unit is transmitted directly to a unit following the selected unit.

5. In a system for concurrently transcribing a message on a plurality of recording media with the aid of a plurality of recording devices each having means for reading the message stored in the respective recording medium, the combination therewith of a system for periodically monitoring the output of each recording device, said system comprising a source of energy for said recording devices; a power supply; a bank of cyclically interconnected monostable multivibrator units each including a normally conductive first amplifier stage and a normally blocked second amplifier stage connected across said power supply, said second stage having an input connected to the reading means of a respective recording device, said first stage being triggerable into a temporary state of nonconductance with concurrent unblocking of said second stage whereby the latter is operative as a reproducer of signals from the respective reading means; a time-constant network connected to the first stage of each unit for determining the duration of said temporary state; circuit means operative upon the termination of said temporary state in response to reversal of conductivity of the stages of any unit for transmitting a trigger pulse to the immediately succeeding unit, thereby initiating said temporary state in said succeeding unit; and a load circuit jointly connected to the outputs of the second stages of all said units.

6. The combination defined in claim 5 wherein said load circuit includes an electroacoustic transducer for audible reproduction of a message sample from each recording medium.

7. The combination defined in claim 5, further comprising switch means operable to deactivate a selected unit together with the associated recording device, said switch means including contacts for completing a bypass connection around the selected unit whereby a trigger pulse from a unit preceding the selected unit is transmitted directly to a unit following the selected unit.

8. The combination defined in claim 5, further comprising a reference recorder connected to receive said message in parallel with said recording devices and provided with continuously operable read-out means, a test circuit connected between said read-out means and said load circuit for comparing the output of said reference recorder with that of a recording device temporarily effective to energize said load circuit, and alarm means responsive to a disparity of said outputs for indicating a malfunction.

9. The combination defined in claim 8 wherein said test circuit comprises a bridge network with a pair of arms including respective amplifier means for signals from said read-out means and from said load circuit.

10. The combination defined in claim 8 wherein said alarm means includes a relay, further comprising switch means operable to deactivate a selected unit together with the associated recording device, said switch means including contacts operable by said relay for completing a bypass connection around the selected unit whereby a trigger pulse from a unit preceding the selected unit is transmitted directly to a unit following the selected unit.

11. The combination defined in claim 5 wherein said network has a time constant on the order of seconds.

References Cited by the Examiner

UNITED STATES PATENTS

| | | | |
|---|---|---|---|
| 2,807,679 | 8/1957 | Ellis | 179—171 |
| 3,031,622 | 4/1962 | Kirchner et al. | 328—48 |
| 3,083,907 | 4/1963 | Crocker et al. | 235—92 |

FOREIGN PATENTS

| | | |
|---|---|---|
| 138,947 | 10/1950 | Australia. |
| 811,968 | 8/1951 | Germany. |

TERRELL W. FEARS, *Acting Primary Examiner.*

BERNARD KONICK, *Examiner.*

J. F. BREIMAYER, *Assistant Examiner.*